(12) United States Patent
Nakashima (10) Patent No.: US 9,067,562 B2
(45) Date of Patent: Jun. 30, 2015

(54) CURTAIN AIRBAG

(71) Applicant: Autoliv Development AB, Vårgårda (SE)

(72) Inventor: Atsushi Nakashima, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/372,722

(22) PCT Filed: Nov. 14, 2012

(86) PCT No.: PCT/JP2012/079456
§ 371 (c)(1),
(2) Date: Jul. 16, 2014

(87) PCT Pub. No.: WO2013/108474
PCT Pub. Date: Jul. 25, 2013

(65) Prior Publication Data
US 2014/0367948 A1    Dec. 18, 2014

(30) Foreign Application Priority Data

Jan. 18, 2012   (JP) .................................. 2012-007645

(51) Int. Cl.
*B60R 21/232* (2011.01)
*B60R 21/2338* (2011.01)
(Continued)

(52) U.S. Cl.
CPC ........... *B60R 21/2334* (2013.01); *B60R 21/232* (2013.01); *B60R 21/2338* (2013.01); *B60R 21/23138* (2013.01); *B60R 2021/23386* (2013.01)

(58) Field of Classification Search
CPC .. B60R 21/201; B60R 21/213; B60R 21/232; B60R 21/2338; B60R 2021/23316; B60R 2021/23386
See application file for complete search history.

(56) References Cited

U.S. PATENT DOCUMENTS 6,312,010 B1 * 11/2001 Heigl .......................... 280/730.2
6,848,708 B2 *  2/2005 Green et al. ................... 280/729
(Continued)

FOREIGN PATENT DOCUMENTS

JP      2004090662 A    3/2004
JP      2008006895 A    1/2008
(Continued)

OTHER PUBLICATIONS

Japanese Patent Office, International Search Report of International Application No. PCT/JP2012/079456, Mailed on Feb. 12, 2013, 2 pages.

*Primary Examiner* — Drew Brown
(74) *Attorney, Agent, or Firm* — Brinks Gilson & Lione (57) ABSTRACT

A curtain airbag housed in an upper part of a side surface portion in a vehicle interior and inflating and deploying along the side surface portion. The curtain airbag includes an end chamber at a front end portion of the curtain airbag that inflates when receiving an inflation and deployment gas. A strap is attached, at a leading end portion thereof, to a first attachment point P on a front pillar 114 of the vehicle and passes through an exterior side of the end chamber, and moreover attached, at a rear end portion thereof, to a seam portion 144 that defines the end chamber. The first attachment portion is set to include a second plane L2 that is vertically below, but parallel to a first plane L1 passing through an A1 break point that is a center of an impact expected area E overlapped with the end chamber.

7 Claims, 9 Drawing Sheets

(51) Int. Cl.
*B60R 21/2334* (2011.01)
*B60R 21/231* (2011.01)

(56) References Cited

U.S. PATENT DOCUMENTS

| | | | |
|---|---|---|---|
| 7,823,922 B2 * | 11/2010 | Mitchell et al. | 280/743.2 |
| 8,636,301 B1 * | 1/2014 | Wang et al. | 280/730.2 |
| 8,876,155 B2 * | 11/2014 | Nakashima et al. | 280/730.2 |
| 8,894,094 B2 * | 11/2014 | Wang et al. | 280/730.2 |
| 2008/0079246 A1 * | 4/2008 | Dix | 280/730.2 |
| 2010/0013203 A1 | 1/2010 | Mitchell et al. | |

FOREIGN PATENT DOCUMENTS

| | | |
|---|---|---|
| JP | 2011528301 A | 11/2011 |
| JP | 2012096780 A | 5/2012 |
| WO | 2010/008918 A1 | 1/2010 |

* cited by examiner

Cross section A-A

| No. | Distance h (mm) | Exterior ejection prevention performance evaluation |
|---|---|---|
| Group 1 | 0~10 | × |
| Group 2 | 10~20 | △ |
| Group 3 | 20~30 | ○ |
| Group 4 | 30~40 | ◎ |
| Group 5 | 40~50 | ◎ |
| Group 6 | 50~60 | ○ |
| Group 7 | 60~70 | △ |
| Group 8 | 70~80 | × |

FIG. 7(a)

| Distance h (mm) | Amount of projection (mm) |
|---|---|
| 0 | 83 |
| 5 | 81 |
| 10 | 80 |
| 15 | 79 |
| 20 | 78 |
| 25 | 77 |
| 30 | 76 |
| 35 | 75 |
| 40 | 74 |
| 45 | 75 |
| 50 | 76 |
| 55 | 77 |
| 60 | 78 |
| 65 | 79 |
| 70 | 80 |
| 75 | 83 |
| 80 | 85 |

CURTAIN AIRBAG

BACKGROUND

1. Field of the Invention

The present invention relates to a curtain airbag that inflates and deploys along a side surface portion in a vehicle interior in order to protect an occupant when the vehicle is subjected to a side impact crash or a rollover.

2. Related Technology

In recent years, vehicles are required to meet higher safety standards. This trend is common throughout the world and most vehicles come equipped with airbags as a safety apparatus throughout the world. Further improvement of safety is an important development theme held out by operators involved in development of vehicles. Accordingly, new airbags are being developed on a daily basis.

Evaluation standards for the safety of vehicles vary among the countries, and the operators develop airbags so that manufactured articles of the operators meet the evaluation standards of many countries. For example, in the U.S., which has the largest number of automobiles owned in the world, National Highway Traffic Safety Administration (NHTSA) has established Federal Motor Vehicle Safety Standards (FMVSS). The Notice of Proposed Rule Making (NPRM: Docket Number; NHTSA-2009-0183) for FMVSS specified by NHTSA proposes the requirement that "upon a side impact crash or a rollover, an ejection mitigation system reduces the likelihood that an occupant is thrown out of the vehicle though a side window". The requirement can be achieved by providing the vehicle with a curtain air bag serving as an exterior ejection mitigation countermeasure apparatus providing an ejection mitigation system. The Notice of Proposed Rule Making (NPRM: Docket Number; NHTSA-2009-0183) referred to herein bases formally established FMVSS226.

The curtain airbag is an airbag installed in the upper part of doors and which inflates and deploys along the side windows of the vehicle when an impact occurs. A cushion portion of the curtain airbag which corresponds to an inflated area is partitioned into a plurality of small rooms (chambers) for the purpose of, for example, implementing smoother flow.

Japanese Patent Application Laid-open No. 2008-6895 discloses a curtain airbag with an end chamber installed at an end of the airbag in a front-rear direction of the vehicle and which inflates and deploys toward the interior of the vehicle more significantly than the other chambers. In the curtain airbag, a tension cloth is passed from the inflated area on a central side of the airbag in the front-rear direction of the vehicle through an exterior side of the end chamber to a front pillar. The tension cloth is tensioned when the curtain airbag inflates and deploys, to move the end chamber so that the end chamber is pushed toward the interior of the vehicle.

In evaluation tests on exterior ejection prevention performance specified in NPRM (NHTSA-2009-0183) in the U.S., an impactor is defined in V. "Proposed Ejection Mitigation Requirements and Test Procedures" of NPRM (NHTSA-2009-0183). Impact targets for the impactor are defined as target locations specified in V. "Proposed Ejection Mitigation Requirements and Test Procedures", d. "Locations Where the Device Would Impact the Ejection Mitigation Countermeasure to Assess Efficacy", and 4. "Method for Determining Impactor Target Locations" of NPRM (NHTSA-2009-0183), which is herein incorporated by reference. These break points are illustrated by target break points described in NPRM, for example, points shown at A1 to A4, B1 to B4, and the like. In the present application, the break point shown as A1 is referred to as the "A1 break point".

There is presently a demand for further improvement of the occupant exterior ejection prevention performance of the curtain airbag. For improvement of the exterior ejection prevention performance, an efficient method is to contact and restrain the occupant early. This is because the early restraint correspondingly reduces the amount by which the occupant is moved toward the exterior of the vehicle.

In this regard, the curtain airbag described in Japanese Patent Application Laid-Open No. 2008-6895 allows the wide tension cloth to push the end chamber toward the interior of the vehicle and thus inflates and deploys at a position closer to the occupant than conventional curtain airbags. Consequently, this curtain airbag can come into contact with the occupant early.

However, the technique described in Japanese Patent Application Laid-Open No. 2008-6895 improves the exterior ejection prevention performance simply by passing the wide tension cloth, which contacts the end chamber over a wide area, through the exterior side of the end chamber. In addition, when the tension cloth is used, the curtain airbag includes a large cloth portion and is thus bulky and difficult to house when the curtain airbag is folded. Furthermore, in this case, the curtain airbag is disadvantageously applicable only to vehicles with a large front pillar.

On the other hand, when a narrow strap is used instead of the wide tension cloth in order to allow the curtain airbag to be more appropriately housed, the area over which the end chamber is supported when the occupant is thrown out of the vehicle is relatively smaller than when the tension cloth is used. This disadvantageously makes improvement of the exterior ejection prevention performance difficult.

The inventors have found that, when a position where the strap narrower than the tension cloth is attached to the front pillar is taken into account, even the use of the strap avoids sacrificing the exterior ejection prevention performance and rather allows the exterior ejection prevention performance to be improved, while ensuring that the curtain airbag can be appropriately housed on the front pillar.

With these problems in view, it is an object of the present invention to provide a curtain airbag that allows the exterior ejection prevention performance to be improved while being appropriately housed on the front pillar.

SUMMARY

To accomplish the object, the present invention provides a typical configuration of a curtain airbag as described below. That is, the curtain airbag according to the present invention is housed in an upper part of a side surface portion in a vehicle interior, and inflates and deploys along the side surface portion. The curtain airbag includes an end chamber, installed at a front end portion of the curtain airbag and inflating when receiving an inflation and deployment gas, and a strap, attached at a leading end portion thereof to a first attachment point on a front pillar of the vehicle and passing through an exterior side of the end chamber and, moreover, attached at a rear end portion thereof to a partition portion that defines the end chamber. The first attachment portion is set to include a second plane resulting from parallel downward movement of a first plane passing through a break point that is a center of an impact expected area overlapped with the end chamber.

The strap referred to herein means a strap having a longitudinal length sufficiently larger than the widthwise length of the strap and shaped like a flat string. Furthermore, the strap itself has a rigidity enough to make the strap more difficult to bend (deform) than a fabric used for the curtain airbag when the flat plane of the strap is pushed in. In other words, the strap is "harder" than the airbag fabric. For expressions such as "up and down", "upper and lower", and "above and below", an "upward direction" refers to a direction toward a roof of the vehicle as viewed from the center of the vehicle, and a "downward direction" refers to a direction toward a floor surface of a compartment of the vehicle. The impact expected area, or just impact area, is an area impacted mainly by the impactor during side impact tests based on FMVSS. This will be described below in detail.

Parallel in "parallel" and "parallel movement" in the present application may refer to a generally parallel state and does not mean geometrically perfectly parallel. The range of the generally parallel state is understood to be an area within which the effects of the present invention are exerted even if a slight inclination is present. Furthermore, the first plane discussed herein is a set of straight lines parallel to the front-rear direction of the vehicle on a plane orthogonal to the vertical direction in the vehicle and is a plane containing a straight line traversing a break point that corresponds to the center of the impact expected area of the curtain airbag when the curtain airbag deploys. Moreover, the second plane is a set of straight lines parallel to the front-rear direction of the vehicle on a plane orthogonal to the vertical direction in the vehicle and is a plane containing a straight line traversing a point having moved downward in the vehicle in the vertical direction from the break point corresponding to the center of the impact expected area of the curtain airbag when the curtain airbag deploys.

In the above-described configuration, since the strap passes through the exterior side of the end chamber, the strap moves the end chamber so as to push the end chamber toward the interior of the vehicle when the curtain airbag inflates and deploys. Thus, the end chamber comes into contact with the occupant early and can quickly restrain the occupant.

In exterior ejection prevention performance evaluation tests, the inventors allowed an impactor simulating an occupant to impact the impact expected area with the distance between the first plane and the second plane appropriately set, and checked the amount of exterior ejection. As a result, the inventors have discovered that the amount of exterior ejection is reduced simply by moving the strap itself downward from the first plane. Thus, in the above-described configuration, the first attachment point to which the leading end portion of the strap is attached is set to include the second plane resulting from parallel downward movement of the first plane.

The second plane may be a plane resulting from parallel downward movement of the first plane by 30 mm to 50 mm. The inventors have newly discovered that, when the distance between the first plane and the second plane is greater than 50 mm, the amount of exterior ejection significantly increases and that, even when the distance is less than 30 mm, the amount of exterior ejection significantly increases. The inventors have also discovered that when the distance is about 40 mm the amount of exterior ejection becomes smallest, which is most preferred. Thus, the inventors have found that the exterior ejection prevention performance can be improved by setting the first attachment point of the strap, passing through the exterior side of the end chamber, to include the second plane resulting from parallel downward movement of the first plane by 30 mm to 50 mm.

Furthermore, the above-described configuration uses the narrow strap instead of what is called the wide tension cloth. When the tension cloth is used, the curtain airbag includes a large cloth portion and is thus bulky and difficult to house when the curtain airbag is folded. This may make the curtain airbag applicable only to, for example, vehicles with a large front pillar. In contrast, the inventors have found that, according to the present application, when the position where the strap narrower than the tension cloth is attached to the front pillar is taken into account to set the first attachment point to include the second plane, the strap can be used to avoid sacrificing the exterior ejection prevention performance and rather allow the exterior ejection prevention performance to be improved, while ensuring that the curtain airbag can be appropriately housed on the front pillar.

A widthwise centerline of the strap may lie within a range in which the second plane is able to be present. That is, preferably, the widthwise centerline of the strap lies within the range of the parallel downward movement of the first plane by 30 mm to 50 mm in the vertical direction in the vehicle. If the widthwise centerline of the strap is present within the above-described range, the centerline need not necessarily be parallel to the first plane and the second plane but may, for example, be inclined in the vertical direction in the vehicle. This makes the strap present within the above-described range when the curtain airbag inflates and deploys, allowing the exterior ejection prevention performance to be improved.

The rear end portion of the strap may be attached to a second attachment point on the curtain airbag which has a height equal to or less than a height of the first attachment point when the end chamber inflates and deploys, and the second attachment point may move closer to the second plane when the inflated and deployed end chamber is pushed toward an exterior of the vehicle. Thus, when a part of the end chamber projects out from the vehicle, the entire strap from the leading end portion to the rear end portion thereof is positioned near the second plane and is parallel to the first plane. In such a case, the strap is made level and tensioned on the exterior side of the end chamber, allowing the exterior ejection prevention performance to be improved.

The partition portion may be a non-inflated area including a thin line portion shaped like a thin line and a wide portion located in a middle of the thin line portion and which is wider than the thin line portion, and the second attachment point may be positioned on the wide portion, and the rear end portion of the strap may be attached by sewing to the wide portion over a sewing area including the second attachment point. This allows the rear end portion of the strap to be sewn over the sewing area included in the wide portion. For example, the periphery of the second attachment point can be sewn in the sewing area. Hence, the rear end portion of the strap can be reliably sewn, allowing a sufficient strength to be maintained.

A sewing line forming the sewing area and located at a most forward position in the sewing area in the vehicle may be positioned further toward the vehicle front side than the thin line portion located near the sewing area. This allows the rear end portion of the strap to be sewn at the sewing line positioned more forward in the vehicle than the thin line portion located near the sewing area. Thus, none of the wide portion includes the sewing area, and this configuration allows the rear end of the strap to be sewn on a more forward side of the vehicle than a case where the rear end of the strap is sewn at the thin line portion. This enables a reduction in the amount by which the strap deflects toward the exterior of the vehicle when the end chamber inflates and deploys, allowing the exterior ejection prevention performance to be improved.

The present invention can provide a curtain airbag that allows the exterior ejection prevention performance to be improved while being appropriately housed on the front pillar.

DETAILED DESCRIPTION

A preferred embodiment of the present invention will be described below in detail with reference to the accompanying drawings. Dimensions, materials, specific numerical values, and the like shown in the embodiment are only examples provided for easy understanding of the invention and are not intended to limit the present invention unless otherwise specified. In the specification and drawings, elements having substantially the same functions and configurations are denoted by the same reference numerals, and duplicate descriptions are omitted. The illustration of elements not directly related to the present invention is omitted.

Figure 1A:
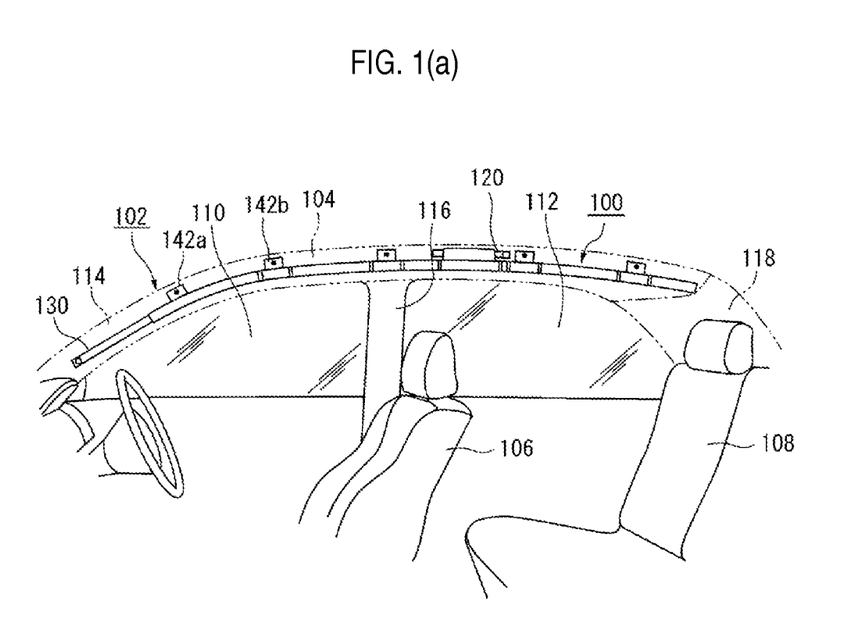
FIGS. 1(a) and 1(b) are schematic diagrams illustrating a curtain airbag according to an embodiment of the present invention.
Figure 1B:
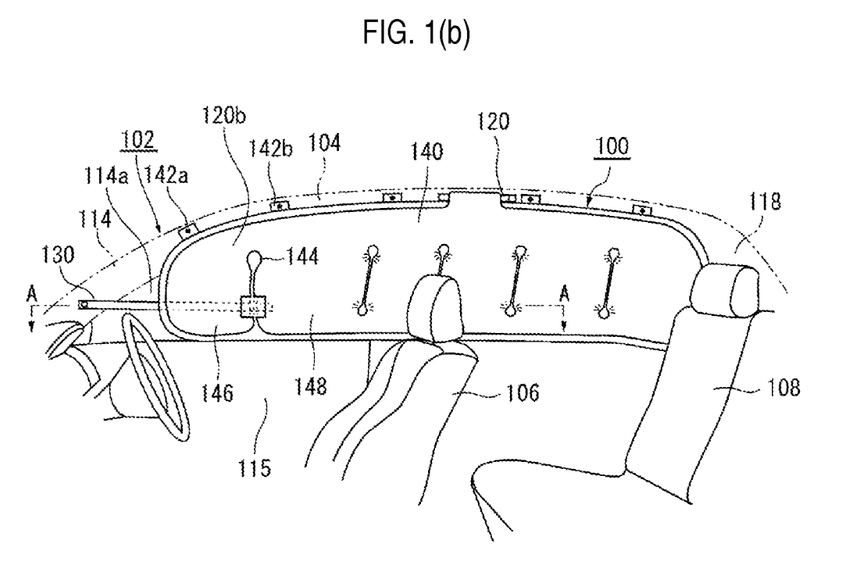

FIGS. 1(a) and 1(b) are schematic diagrams illustrating a curtain airbag 100 according to an embodiment of the present invention. FIG. 1(a) illustrates that the curtain airbag 100 has not inflated yet. FIG. 1(b) illustrates that the curtain airbag 100 has inflated and deployed. The curtain airbag 100 is intended for a right side surface of a vehicle 102. A curtain airbag for a left side surface (not shown in the drawings) has a similar symmetric structure.

The curtain airbag 100 in a rolled state (or in a folded state) as shown in FIG. 1(a) is housed by being attached to a roof side rail 104 shown by an imaginary line in an upper part of the side surface portion in the vehicle interior. The curtain airbag 100 is formed into a bag shape by, for example, sewing a base cloth from the front and back thereof which cloth provides a front surface of the curtain airbag 100 or performing spinning and weaving using one-piece woven (OPW).

The vehicle 102 is a vehicle with two rows of seats including a front seat 106 located forward in the vehicle and a rear seat 108 located behind the front seat 106. On the side surface portion of the vehicle 102, a side window 110 is arranged forward and a side window 112 is arranged rearward of the vehicle. Pillars that support a roof (ceiling) are provided on front and rear sides of each of the side windows of the vehicle. The pillars are connected to a roof side rail 104 and referred to as a front pillar 114, a center pillar 116, and a rear pillar 118, which are arranged in this order from the front toward the rear of the vehicle 102.

The curtain airbag 100 includes an inflator 120 serving as a gas generation apparatus, a strap 130, and a cushion portion 140 shown in FIG. 1(b). The curtain airbag 100 has tabs 142a and 142b used to attach the cushion portion 140 to the vehicle 102.

The cushion portion 140 inflates and deploys downward along, for example, the side windows 110 and 112 corresponding to the side surface portion of the compartment under the pressure of the gas supplied by the inflator 120 (see FIG. 1(b)), thus protecting an occupant. By means of a seam portion 144, the cushion portion 140 is partitioned into an end chamber 146 expected to come into contact with an occupant and a plurality of other chambers 148. As shown figures, the end chamber 146 is installed in a front side end portion of the cushion portion 140 in the front-rear direction of the vehicle. The other chambers 148 are positioned behind the end chamber 148 in the vehicle via the seam portion 144.

The strap 130 is a member shaped like a string. The strap 130 is attached to the front pillar 114 at a leading end portion of the strap 130, passes through an exterior side of the end chamber 146, and is attached to the seam portion 144 at a rear end portion of the strap 130 (this will be described below in detail).

Figure 2A:
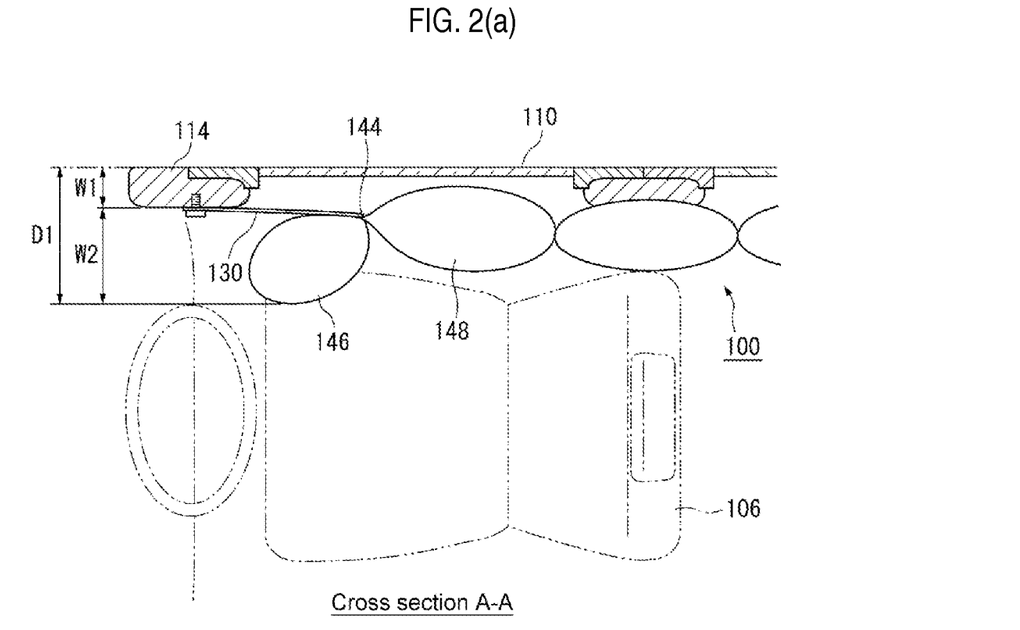
FIGS. 2(a) and (b) are diagrams showing a comparison between the curtain airbag in FIG. 1 and a curtain airbag of a comparative example.
Figure 2B:
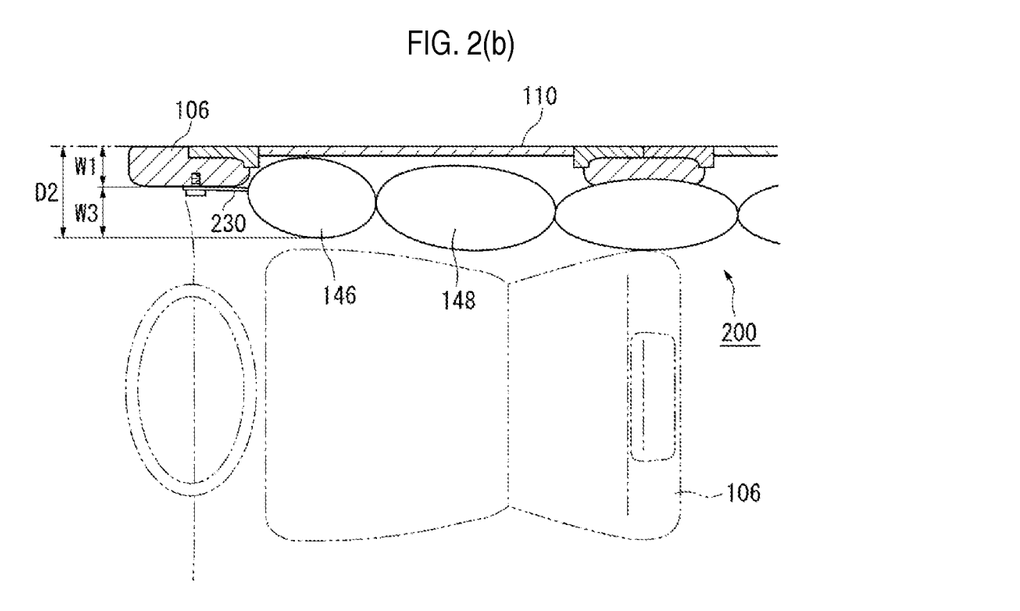

FIGS. 2(a) and 2(b) are diagrams showing a comparison between the curtain airbag 100 in FIG. 1(b) and a curtain airbag 200 in a comparative example. FIG. 2(a) is a cross-sectional view of the curtain airbag 100 taken along line A-A in FIG. 1(b). FIG. 2(b) is a cross-sectional view showing the curtain airbag 200 in the comparative example and corresponding to FIG. 2(a).

In the curtain airbag 100, as shown in FIG. 2(a), the rear end portion of the strap 130 is attached to the seam portion 144 behind the end chamber 146. The behavior of the curtain airbag 100 during deployment varies according to the size of the curtain airbag 100 and a position where the curtain airbag 100 is attached to the roof side rail 104. Here, it is assumed that, when the curtain airbag 100 in its rolled state inflates and deploys, the seam portion 144 moves rearward from its initial position. In this case, the length of the strap 130 is set smaller than a length from a position on the front pillar 114 to which the leading end portion of the strap 130 is attached to a position to which the seam portion 144 is to move as a result of inflation and deployment of the curtain airbag 100. In other words, the length of the strap 130 is small enough to inhibit the seam portion 144 from moving to a target position or a position it would assume absent the strap 130.

Thus, the seam portion 144 is stopped by the strap 130 set to a substantially straight state and is prevented from actually moving to the target position. On the other hand, after inflation and deployment, the strap 130 is substantially linearly tensioned so as to be pulled rearward in the vehicle by the seam portion 144.

Furthermore, the front pillar 114 to which the leading end portion of the strap 130 is attached is an area projecting to the interior of the vehicle compared to the side window 110 (the amount of projection≈a width W1). Tension is applied to the strap 130 toward the rear of the vehicle to cause the end chamber 146 to be pushed toward the interior of the vehicle by the strap 130 to project to the interior of the vehicle (the amount of projection≈a width W2).

Thus, in the curtain airbag 100, as shown in FIG. 2(a), the amount of projection D1 by which the end chamber 146 projects from the side window 110 toward the interior of the vehicle is equal to an amount (W1+W2) obtained by adding the width W1 of the front pillar 114 to the width W2 of the end chamber 146.

On the other hand, in the curtain airbag 200 in the comparative example, as shown in FIG. 2(b), a strap 230 is attached to a front end of the end chamber 146. In this case, when the curtain airbag 200 inflates and deploys, the end chamber 146 applies tension in the rearward direction of the vehicle to tension the strap 230. In the curtain airbag 200, as shown in FIG. 2(b), the strap 230, the end chamber 146, and the other chambers 148 are arranged substantially in a line along, for example, the side window 110 in the side surface portion of the vehicle.

In the case of the comparative example, the end chamber 146 is prevented from being pushed toward the interior of the vehicle by the strap 130. Hence, in the curtain airbag 200, as shown in FIG. 2(b), the amount of projection by which the end chamber 146 projects toward the interior of the vehicle is small (the amount of projection≅a width W3, W3<W2).

Thus, in the curtain airbag 200, as shown in FIG. 2(b), the amount of projection D2 by which the end chamber 146 projects from the side window 110 toward the interior of the vehicle is equal to an amount (W1+W3) obtained by adding the width W1 of the front pillar 114 to the width W3 of the end chamber 146.

As described above, compared to the curtain airbag 200 in the comparative example, the end chamber 146 projects (moves) significantly further toward the interior side of the vehicle. In other words, in the curtain airbag 100, the strap 130 passing through the exterior side of the end chamber 146 pushes and moves the end chamber 146 toward the interior of the vehicle during inflation and deployment as described above. Thus, the end chamber 146 comes into contact with the occupant early to allow the occupant to be quickly restrained.

Figure 3A:
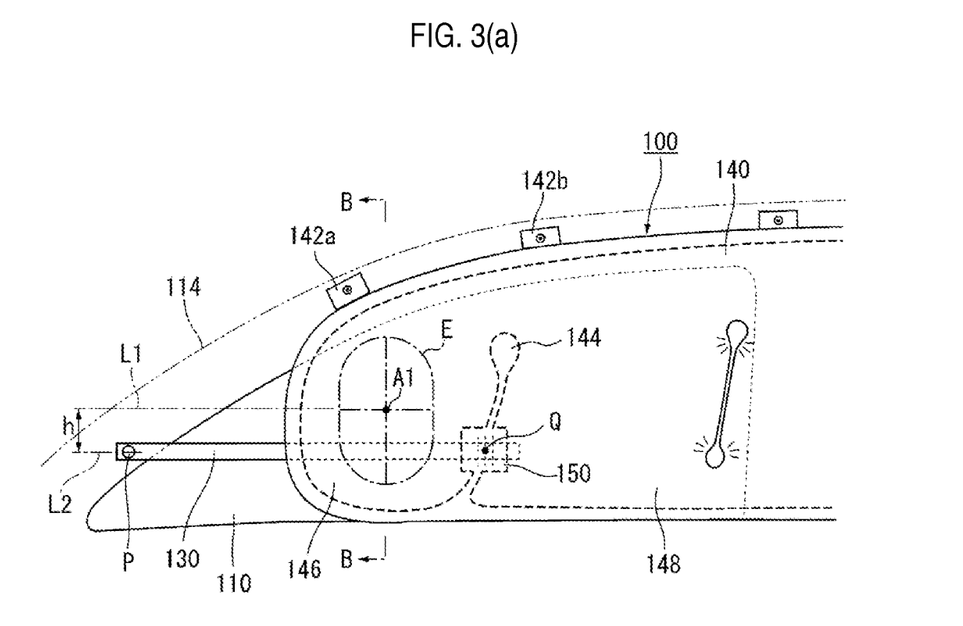
FIGS. 3(a) and 3(b) are diagrams illustrating a part of the curtain airbag shown in FIG. 1.
Figure 3B:
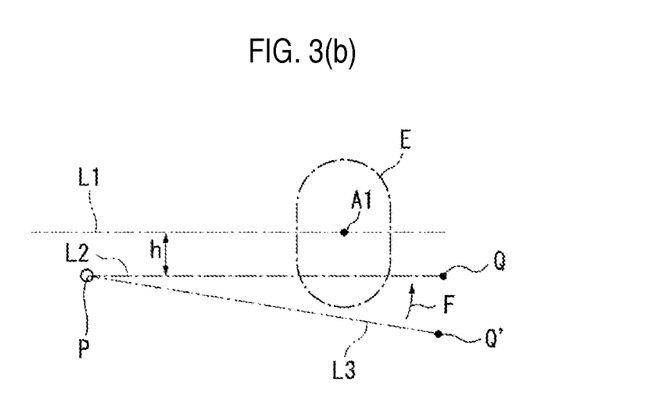

Now, the position to which the strap 130 is attached will be described in detail below with reference to the drawings. FIGS. 3(a) and 3(b) are diagrams illustrating a part of the curtain airbag 100 in FIG. 1(b). FIG. 3(a) is an enlarged view showing the curtain airbag 100 in the area of the end chamber 146. FIG. 3(b) is a diagram schematically showing the position of the strap 130 shown in FIG. 3(a).

Figure 4A:
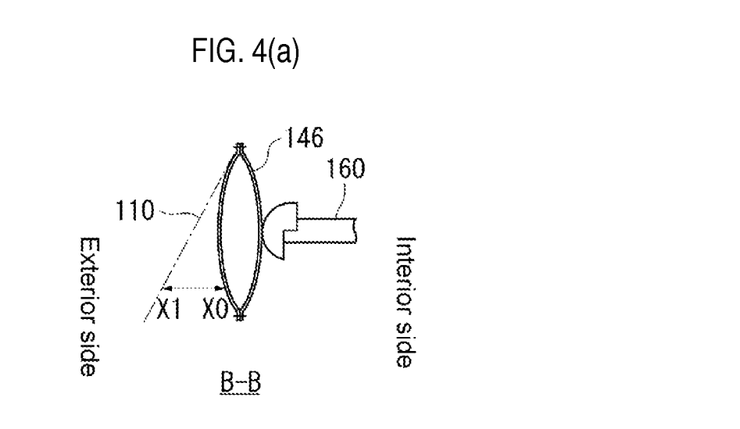
FIGS. 4(a)-4(c) are schematic diagrams illustrating how an impactor impacts an end chamber of FIG. 3.

As shown in FIG. 3(a), the end chamber 146 overlaps an impact expected area E. The impact expected area E is an area specified as an impact target for an impactor 160 (see FIG. 4) using a window frame as a reference, in exterior ejection prevention performance evaluation tests based on federal motor vehicle safety standards (FMVSS). The impactor 160 is a test apparatus simulating an occupant and impacting a test target airbag from the interior of the vehicle.

During side impact crash tests based on FMVSS, the impactor 160 serving as a test apparatus is allowed to impact a predetermined break point set on the curtain airbag 100, and the curtain airbag 100 is evaluated for safety (exterior ejection prevention performance evaluation tests). In particular, a break point located at the front-most position on the side window 110 (the center of the impact expected area E) is referred to as an A1 break point.

As shown in FIG. 3(a), the leading end portion of the strap 130 is attached to the front pillar 114 at a first attachment point P. In other words, the first attachment point P is set on the front pillar 114. Furthermore, the strap 130 passes through the exterior side of the end chamber 146 and the rear end portion of the strap 130 is attached to the seam portion 144 at a second attachment point Q, as shown by a dotted line in FIG. 3(a). As shown in FIG. 3(a), the seam portion 144 includes a wide portion 150 formed therein and which is wider than parts of the seam portion 144 located around the wide portion 150 and which includes the second attachment point Q. In other words, the second attachment point Q is set on the seam portion 144. In FIG. 3(a), the wide portion 150 is shown in an exaggerated manner. Additionally, in FIG. 3(b), the front pillar 114 and the seam portion 144 are omitted.

The first attachment point P is set to include a second plane L2 resulting from parallel downward movement of a first plane L1 by a distance h (for example, 40 mm) as shown in FIG. 3(a) and FIG. 3(b).

Here, the first plane L1 is a set of straight lines parallel to the front-rear direction of the vehicle on a plane orthogonal to the vertical direction in the vehicle and is a plane containing a straight line traversing the A1 break point corresponding to the center of the impact expected area E of the curtain airbag 100 overlapping the end chamber 146 when the curtain airbag 100 deploys. Furthermore, the second plane L2 is a set of straight lines parallel to the front-rear direction of the vehicle on a plane orthogonal to the vertical direction in the vehicle and is a plane containing a straight line traversing a point resulting from downward movement of the first plane L1 in the vertical direction in the vehicle from the A1 break point corresponding to the center of the impact expected area E when the curtain airbag 100 deploys.

Figure 7A:
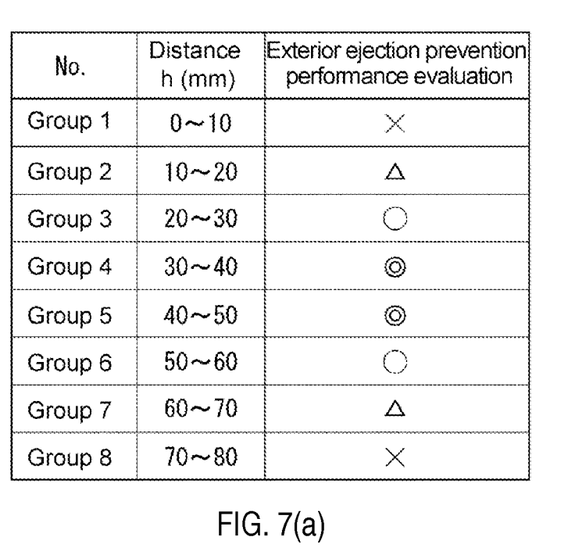
FIGS. 7(a) and 7(b) are diagrams showing results of exterior ejection prevention performance evaluation tests.
Figure 7B:
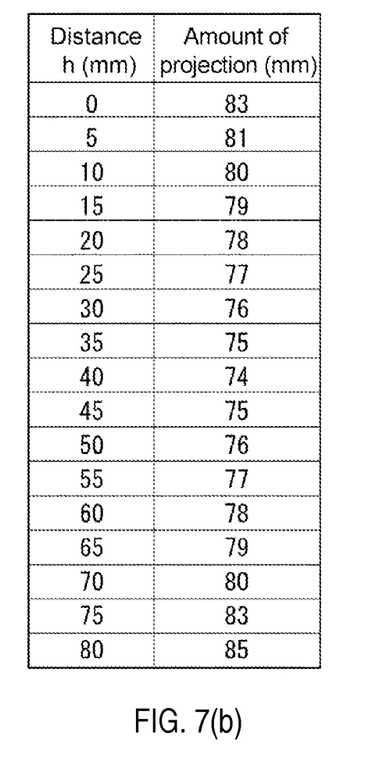

The distance h is set to 40 mm. However, the embodiment is not limited to this. The distance h may be appropriately set within the range from 30 mm to 50 mm. In the exterior ejection prevention performance evaluation tests, the inventors determined the range within which the amount of exterior ejection decreased while appropriately setting the distance h (this will be described in detail with reference to FIG. 7).

Furthermore, the rear end portion of the strap 130 is attached to the second attachment point Q set to include the second plane L2 similarly to the first attachment point P as shown in FIG. 3(a). However, the embodiment is not limited to this. By way of example, the rear end portion of the strap 130 may be attached to the seam portion 144 at a second attachment point Q' located downward and away from the second attachment point Q as shown in FIG. 3(b). As typified by the second attachment points Q and Q', the second attachment point preferably has a height equal to or lower than the height of the first attachment point P when the end chamber 146 inflates and deploys.

When the rear end portion of the strap 130 is attached to the second attachment point Q', the strap 130 is positioned to define a third plane L3 extending obliquely downward from the first attachment point P located on the second plane L2 when the end chamber 146 inflates and deploys. After the end chamber 146 inflates and deploys, the second attachment point Q' may move onto or closer to the second plane L2 as shown by arrow F in FIG. 3(b) by the time when the end chamber 146 is pushed by the impactor 160 described below and partly projects out from the vehicle. At this time, the strap 130 is made level along the front-rear direction of the vehicle because the first attachment point P and the second attachment point Q' are positioned so as to include the second plane L2.

Figure 4B:
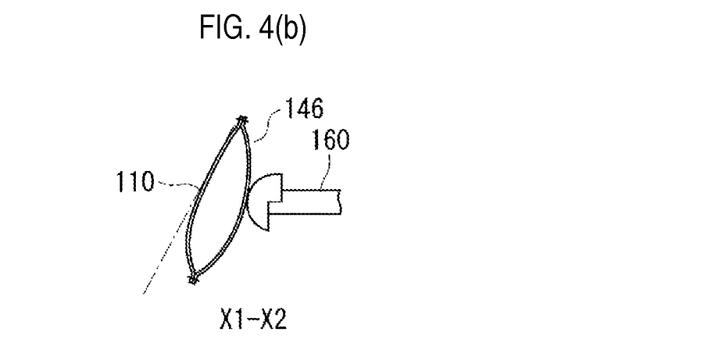
Figure 4C:
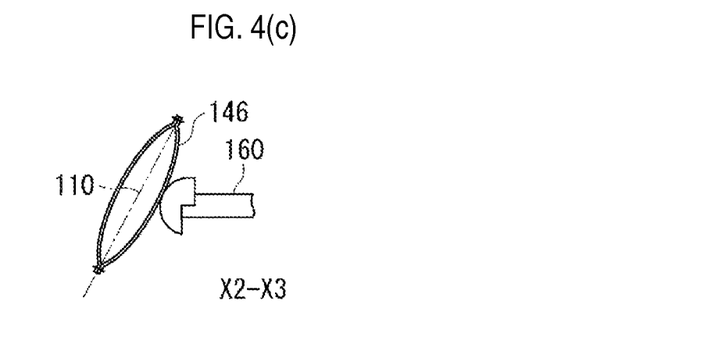

A case where the impactor 160 impacts the end chamber 146 will be described below with reference to FIGS. 4(a)-4(c) and FIG. 5. FIGS. 4(a)-4(c) are schematic diagrams illustrating how the impactor 160 impacts the end chamber 146 in FIG. 3(a). FIG. 4(a) corresponds to a cross section taken along line B-B in FIG. 3(a) and illustrates that the impactor 160 moves from the interior side of the vehicle to come into contact with the end chamber 146. FIG. 4(b) shows that the impactor 160 shown in FIG. 4(a) has moved toward the exterior of the vehicle. FIG. 4(c) shows that the impactor 160 shown in FIG. 4(b) has further moved toward the exterior of the vehicle. Coordinates indicative of displacement (mm) of the end chamber 146 are denoted by X0, X1, X2, and X3 in FIGS. 4(a)-4(c).

Figure 5:
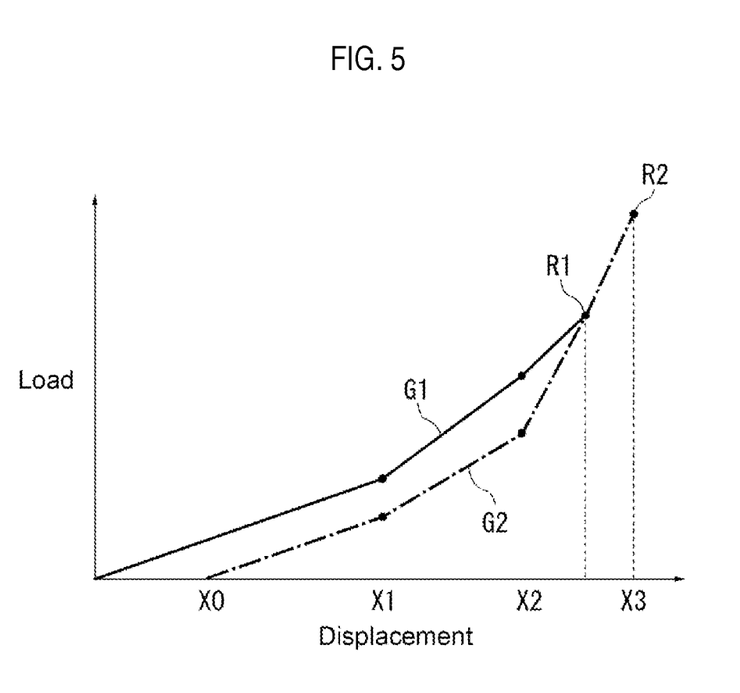
FIG. 5 is a graph schematically showing the relationship between displacement of the end chamber in FIG. 4 and a load on the end chamber.

FIG. 5 is a graph schematically showing the relation between the displacement of the end chamber 146 in FIGS.

4(a)-4(c) and a load on the end chamber 146. The load as referred to herein means a reaction force exerted on the impactor 160 through the end chamber 146. In FIG. 5, a graph G1, shown by a solid line, is indicative of the relation between the displacement and the load observed when the strap 130 passes through the exterior of the end chamber 146. A graph G2, shown by an alternate long and short dash line, indicates the relation between the displacement and the load observed when the strap 130 is not provided. Furthermore, points R1 and R2 shown in the graphs G1 and G2, respectively, each illustrate a peak of the load.

The end chamber 146 is pushed and moved toward the interior of the vehicle by the strap 130 during inflation and deployment as described above. Hence, the push provided by the strap 130 causes the end chamber 146 to come into contact with the impactor 160 earlier than in the case where the strap 130 is not provided. Thus, the graph G1 indicates that, at a location with the coordinates X0, the impactor 160 is already in contact with the end chamber 146 (see FIG. 4(a)) and is subjected to a load though the end chamber 146. On the other hand, the graph G2 indicates that, at the location with the coordinates X0, the impactor 160 is not in contact with the end chamber 146 or has just come into contact with the end chamber 146 and is not subjected to a load through the end chamber 146 yet.

Furthermore, the coordinates X1 shown in FIG. 4(a) show that the end chamber 146 has moved to the position of the side window 110. The graphs G1 and G2 indicate that, at a location with the coordinates X1, the impactor 160 is subjected to a load through the end chamber 146. The load applied through the end chamber 146 depends on the internal pressure of the end chamber 146, and thus, the graphs G1 and G2 have approximately the same gradient. For the load at the coordinates X1, the value on the graph G1 is larger than the value on the graph G2.

Moreover, FIG. (b) shows that the end chamber 146 moves from the coordinates X1 to the coordinates X2 and is thus pushed by the impactor 160 and deformed at the position of the side window 110. As shown on the graphs G1 and G2, for the load at the coordinates X2, the value on the graph G1 is larger than the value on the graph G2.

FIG. 4(c) shows that the end chamber 146 has further moved toward the exterior of the vehicle, with a part of the end chamber 146 being positioned more outward from the vehicle than the side window 110. In this state, it is possible that only the strap 130 is present on the exterior side of the end chamber 146. In such a case, preferably, as shown by arrow F in FIG. 3(b), the second attachment point Q' of the strap 130 moves onto the second plane L2 and is made level along the front-rear direction of the vehicle and tensioned on the exterior side of the end chamber 146.

Subsequently, the graph G1 reaches the peak shown at the point R1 after passing through the coordinates X2 and before reaching the coordinates X3. On the other hand, when the strap 130 is not provided, the graph G2 passes from the coordinates X2 to the coordinates X3, and at the coordinates X3, reaches the peak shown at the point R2. The peak shown at the point R1 is smaller than the peak shown at the point R2.

Thus, a comparison between the graphs G1 and G2 clearly indicates that passing the strap 130 through the exterior side of the end chamber 146 causes the end chamber 146 to come into contact with the impactor 160 early, consequently allowing the end chamber 146 to absorb impact energy early, enabling a reduction in the peak of the load applied to the impactor 160.

Figure 6:
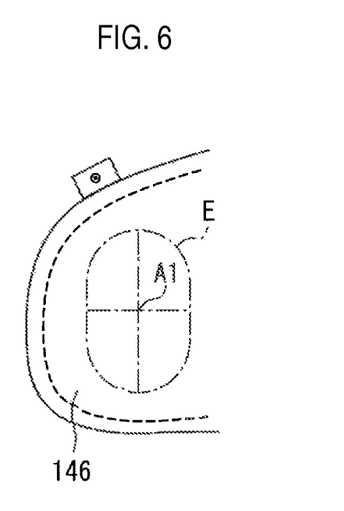
FIG. 6 is a diagram illustrating an impact expected area.

The results of exterior ejection prevention performance evaluation tests with the distance h (see FIGS. 3(a) and 3(b)) appropriately set will be described below with reference to FIG. 6 and FIGS. 7(a) and 7(b). FIG. 6 is a diagram illustrating the impact expected area. FIG. 6 shows the impact expected area E and the A1 break point, which overlap the end chamber 146 shown in FIG. 3.

FIGS. 7(a) and 7(b) are diagrams showing the results of the exterior ejection prevention performance evaluation tests. FIG. 7(a) shows groups 1 to 8 set according to the value of the distance h and the test results for the groups 1 to 8. FIG. 7(b) shows numerical data (the amount of projection) "⊚" on which the test results shown in FIG. 7(a) are based.

"⊗" shown in FIG. 7(a) indicate that the amount of exterior ejection (the amount of projection) is "less than 76 mm" "O" shown in FIG. 7(a) indicate that the amount of projection is "76 mm to 78 mm" "Δ" shown in FIG. 7(a) indicates that the amount of projection is "78 mm to 80 mm" "×" shown in FIG. 7(a) indicates that the amount of projection is "80 mm or more". The inventors carried out the tests with the distance h changed at intervals of 5 mm and appropriately checked the amount of projection. The amounts of projection and numerical data were obtained using the curtain airbag 100 used for the tests and vary according to the shape of the chamber, the individual internal pressures, and the like.

The test results indicate that the amount of projection deceases if the strap 130 is located lower than when the distance h is 0 mm, as shown in FIG. 7(a). In particular, when the distance h is between 30 mm and 50 mm, the amount of projection is small and the test results are appropriate. As shown in FIG. 7(b), the amount of projection is smallest when the distance h is 40 mm (the amount of projection: 74 mm). Therefore, the distance h is most preferably 40 mm±10 mm.

When the impactor 160 pushes the curtain airbag 100, the curtain airbag 100 turns toward the exterior of the vehicle around the neighborhood of an upper end portion of the curtain airbag 100 as shown in FIGS. 4(a)-4(b). In conjunction with this turn, the strap 130 relatively moves from a lower position to an upper position. If the strap 130 is not provided on the second plane L2 resulting from parallel downward movement of the first plane L1 and only the second attachment point Q is set below the first plane L1, the turn of the curtain airbag 100 loosens the strap 130. When the strap 130 is provided below and substantially parallel to the first plane L1, the tension of the strap 130 increases in conjunction with the turn of the curtain airbag 100. Therefore, the strap 130 is preferably provided below and substantially parallel to the first plane L1.

Thus, the inventors have evidently found that the curtain airbag 100 according to the present embodiment allows the exterior ejection prevention performance to be improved by setting the first attachment point P of the strap 130 passing through the exterior side of the end chamber 146 to include the second plane L2 resulting from parallel downward movement of the first plane L1 by 30 mm to 50 mm.

Furthermore, the curtain airbag 100 uses the narrow strap 130 instead of what is called a wide tension cloth and can thus be easily housed on the front pillar 114. When the tension cloth is used, the curtain airbag 100 includes a large cloth portion and is thus bulky and difficult to house when the curtain airbag 100 is folded. This may make the curtain airbag 100 applicable only to, for example, vehicles with a large front pillar.

In other words, in the curtain airbag 100, when the position where the strap 130 narrower than the tension cloth is attached to the front pillar 114 is taken into account to set the first attachment point P to include the second plane L2, even the use of the strap 130 avoids sacrificing the exterior ejection prevention performance and, rather, allows the exterior ejection prevention performance to be improved, while ensuring that the curtain airbag 100 can be appropriately housed on the front pillar 114.

Figure 8A:
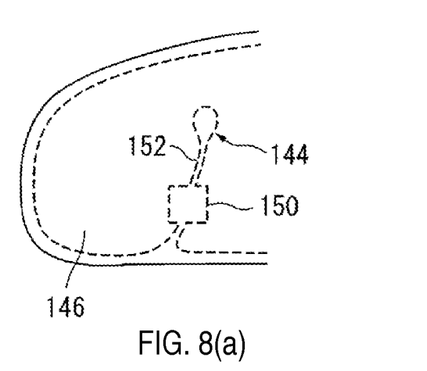
FIGS. 8(a)-8(e) are diagrams showing a comparison between a seam portion of FIG. 3 and a seam portion of a comparative example.
Figure 8B:
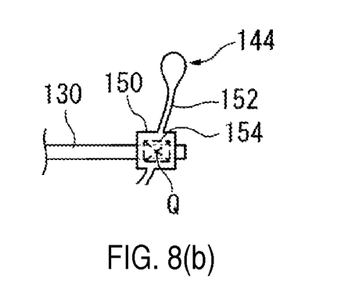

The seam portion 144 will be described below with reference to FIGS. 8(a)-8(c) and FIGS. 9(a)-9(c). FIGS. 8(a)-8(e) are diagrams showing a comparison between the seam portion 144 in FIG. 3(a) and a seam portion 244 in a comparative example. FIG. 8(a) schematically shows the seam portion 144 in FIG. 3(a). FIG. 8(b) shows that the second attachment point Q is set on the seam portion 144. FIG. (c) shows the case of the use of a sealing material. FIG. 8(d) schematically shows the seam portion 244 in the comparative example. FIG. 8(e) shows that the second attachment point Q is set on the seam portion 144. The seam portions 144 and 244 partition the end chamber 146.

As shown in FIG. 8(a), the seam portion 144 has the wide portion 150 and a thin line portion 152 shaped like a thin line. The wide portion 150 having a width greater than that of the line portion 152 is located in the middle of the thin line portion 152.

As shown in FIG. 8(b), the second attachment point Q is positioned on the wide portion 150. Furthermore, the wide portion 150 has not only the second attachment point Q, but also a sewing area 154 including the periphery of the second attachment point Q. The rear end portion of the strap 130 is attached, by sewing, to the wide portion 150 over the sewing area 154. Thus, in the seam portion 144, the periphery of the second attachment point Q can be sewn in the sewing area 154 included in the wide portion 150 as shown in FIG. 8(b). Hence, the seam portion 144 having the wide portion 150 enables the rear end portion of the strap 130 to be reliably sewn, allowing a sufficient strength to be maintained.

Figure 8C:
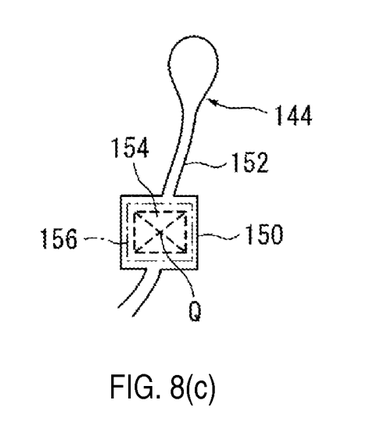
Figure 8D:
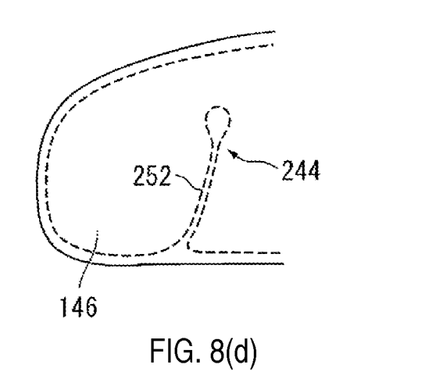
Figure 8E:
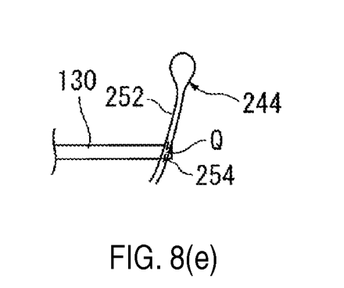

Furthermore, since the seam portion 144 has the wide portion 150, even when a sealing member 156 is used as shown in FIG. 8(c), a space for sewing can be provided using the sewing area 154, allowing sewing to be easily achieved.

In contrast, the seam portion 244 in the comparative example does not include the wide portion 150 but has a thin line portion 252 shaped like a thin line as shown in FIG. 8(d). The thin line portion 252 is, for example, only 7 mm in width.

Thus, as shown in FIG. 8(e), the second attachment point Q is positioned on the narrow thin line portion 252. In other words, the rear end portion of the strap 130 is attached to the thin line portion 252 by performing sewing on the narrow thin line portion 252 as shown by a sewing line 254. Hence, the seam portion 244 in the comparative example cannot have a space large enough to implement reliable sewing of the rear end portion of the strap 130.

Figure 9A:
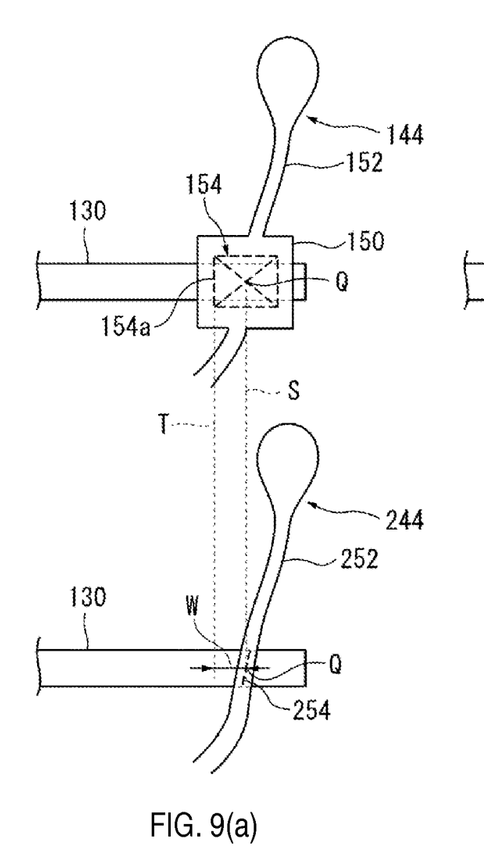
FIGS. 9(a)-9(c) are schematic diagrams illustrating the positional relation between a strap and the seam portion in FIG. 3.
Figure 9B:
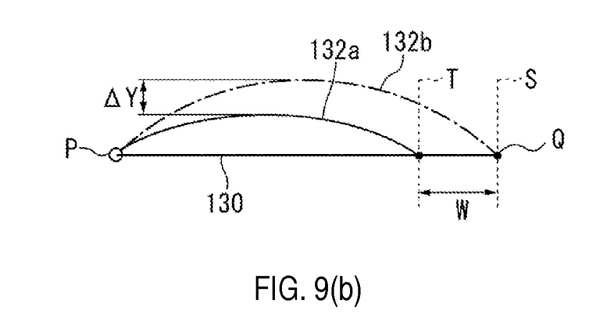
Figure 9C:
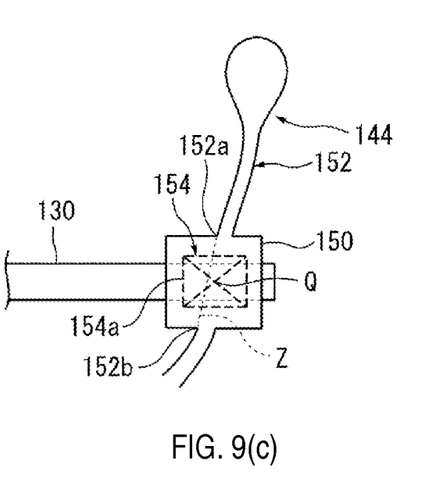

FIGS. 9(a) and 9(b) are schematic diagrams illustrating the positional relation between the strap 130 in FIG. 3(a) and the seam portions 144 and 244. FIG. 9(a) is a diagram showing a comparison between a state where the strap 130 is attached to the seam portion 144 and a state where the strap 130 is attached to the seam portion 244. FIG. 9(b) is a diagram showing a comparison between a state where the strap 130 attached to the seam portion 144 deflects toward the exterior of the vehicle and a state where the strap 130 attached to the seam portion 244 deflects toward the exterior of the vehicle. FIG. 9(c) illustrates the positions of the wide portion 150 and thin line portion 152 of the seam portion 144.

In the seam portion 144, as shown in FIG. 9(a), the rear end portion of the strap 130 is attached by sewing the second attachment point Q and the periphery thereof in the sewing area 154 included in the wide portion 150. A dotted line S shows the position of the second attachment point Q.

A sewing line 154a shown in FIG. 9(a) is one of a plurality of sewing lines forming the sewing area 154 that is positioned closest to the exterior of the vehicle. A dotted line T shows the position of the sewing line 154a.

In the seam portion 244, as shown in FIG. 9(a), the second attachment point Q is positioned on the thin line portion 252, and the leading end portion of the strap 130 is attached by performing sewing as shown by a sewing line 254. FIG. 9(a) shows that, in both the seam portions 144 and 244, the second attachment point Q is positioned on the dotted line S.

The dotted line T showing the sewing line 154a is positioned more forward in the vehicle than the second attachment point Q in the seam portion 244 by a distance W. In other words, the seam portion 144 with the wide portion 150 allows the rear end portion of the strap 130 to be sewn at a position more forward in the vehicle by the distance W than the seam portion 244, not having the wide portion 150, but formed of the thin line portion 252.

Thus, with the rear end portion of the strap 130 attached to the seam portion 144, the strap 130 deflects toward the exterior of the vehicle between the first attachment point P and the sewing line 154a (the dotted line T in FIG. 9(b)), positioned more frontward than the second attachment point Q by the distance W, for example, when the end chamber 146 inflates and deploys, as shown in FIG. 9(b). FIG. 9(b) illustrates the deflected strap 130 as a strap 130a shown by a solid line in FIG. 9(b).

In contrast, with the rear end portion of the strap 130 attached to the seam portion 244, the strap 130 deflects toward the exterior of the vehicle between the first attachment point P and the second attachment point Q, for example, when the end chamber 146 inflates and deploys, as shown in FIG. 9(b). FIG. 9(b) illustrates the deflected strap 130 as a strap 130b shown by an alternate long and short dash line in FIG. 9(b).

As shown in FIG. 9(b), the strap 130a deflects toward the exterior of the vehicle by a smaller amount than the strap 130b. FIG. 9(b) shows that the deflection of the strap 130a is smaller than the deflection of the strap 130b by an amount equivalent to a distance $\Delta Y$.

The thus reduced deflection toward the exterior of the vehicle decreases even slightly the peak of the graph G1 shown by the point R1. Therefore, when the rear end portion of the strap 130 is attached to the seam portion 144 with the wide portion 150, the exterior ejection prevention performance can consequently be improved.

More specifically, in the seam portion 144, the sewing line 154a, forming the sewing area 154 and located at the most forward position in the sewing area 154 in the vehicle, is positioned more forward than a straight line Z joining together boundary points 152a and 152b between the wide portion 150 and the thin line portion 152, as shown in FIG. 9(c). Meeting such a positional relation between the sewing line 154a and the straight line Z enables a reduction in the deflection of the strap 130 toward the exterior of the vehicle as shown in FIG. 9(b), allowing the exterior ejection prevention performance to be improved.

According to the embodiment, the amount of exterior ejection is reduced by passing the strap 130 through the exterior side of the end chamber 146 and further setting the first attachment point P of the strap 130 on the second plane L2. Thus, the end chamber 146 deploys at a position where the end chamber 146 avoids overlapping the side window 110 as shown in FIG. 3(a). However, the embodiment is not limited to this. The end chamber 146 may deploys at a position where the end chamber 146 overlaps the side window 110.

Furthermore, in the embodiment, if the first attachment point P of the strap 130 is set to include the second plane L2, the widthwise centerline (for example, a line shown by an alternate long and short dash line joining the first attachment point P and the second attachment point Q together in FIG. 3(b)) of the strap 130 preferably lies within the range in which the second plane L2 can be present, that is, the range of parallel downward movement of the first plane L1 in the vertical direction in the vehicle by 30 mm to 50 mm. If the widthwise centerline of the strap 130 is present within the above-described range, the strap 130 need not necessarily be parallel to the first plane L1 and the second plane L2, but may, for example, be inclined in the vertical direction in the vehicle. Furthermore, the strap 130 is present within the above-described range when the curtain airbag 100 inflates and deploys, allowing the exterior ejection prevention performance to be improved.

The preferred embodiment of the present invention has been described with reference to the attached drawings. Needless to say, the present invention is not limited to such an example. Those skilled in the art may evidently contrive many variations or modifications of the embodiment without departing from within the range set forth in the claims. It is understood that those variations or modifications belong to the technical scope of the present invention.

Furthermore, in the above embodiment the example has been described in which the curtain airbag 100 according to the present invention is applied to an automobile. However, the curtain airbag 100 according to the present invention is also applicable to vehicles other than automobiles such as airplanes and ships and enables similar effects to be exerted.

The present invention can be utilized for a curtain airbag that inflates and deploys along a side surface portion in a vehicle interior in order to protect an occupant when the vehicle is subjected to a side impact crash or a rollover.

What is claimed is:

1. A curtain airbag housed in an upper part of a side surface portion of a vehicle interior, and inflating and deploying along the side surface portion, the curtain airbag comprising:
    an end chamber provided at a front end portion of the curtain airbag and defined in part by a partition portion, the end chamber inflating when receiving an inflation and deployment gas; and
    a strap having a leading end portion attached to a first attachment point on a front pillar of the vehicle, the strap passing along an exterior side of the end chamber, the strap having a rear end portion attached to the partition portion that defines the end chamber,
    wherein the first attachment point is provided in a second plane that is parallel to and downwardly located relative to a first plane, the first plane being a horizontal plane passing through a break point that is defined as a center of an impact area overlapped with the end chamber, whereby when at least part of the end chamber is moved outwardly relative to the vehicle the entire strap from the leading end portion to the rear end portion is positioned along the second plane and parallel to the first plane.

2. The curtain airbag according to claim 1, wherein the second plane is located downward relative to the first plane a distance in a range of 30 mm to 50 mm.

3. The curtain airbag according to claim 2, wherein a widthwise centerline of the strap generally lies within the range in which the second plane is located.

4. The curtain airbag according to claim 1, wherein
    the rear end portion of the strap is attached to a second attachment point on the curtain airbag, the second attachment point being located from the first plane at a distance equal to or greater than a distance that the first attachment point is located from the first plane when the end chamber is inflated and deployed, and
    the second attachment point configured to move vertically closer to the second plane when the end chamber is pushed toward an exterior of the vehicle after being inflated and deployed.

5. The curtain airbag according to claim 4, wherein
    the partition portion is a non-inflated area including a thin line portion shaped like a thin line and a wide portion which is located in a middle of the thin line portion and which is wider than the thin line portion,
    the second attachment point being positioned on the wide portion, and
    the rear end portion of the strap being attached by sewing to the wide portion over a sewing area that includes the second attachment point.

6. The curtain airbag according to claim 5, wherein a sewing line forming part of the sewing area and located at a most forward position in the sewing area is positioned further toward a forward end of the vehicle than the thin line portion located near the sewing area.

7. The curtain airbag according to claim 1, wherein a widthwise centerline of the strap generally lies within the second plane.

* * * * *